A. L. VISSAT.
SWITCH.
APPLICATION FILED MAR. 31, 1908.
912,049.
Patented Feb. 9, 1909.
3 SHEETS—SHEET 1.
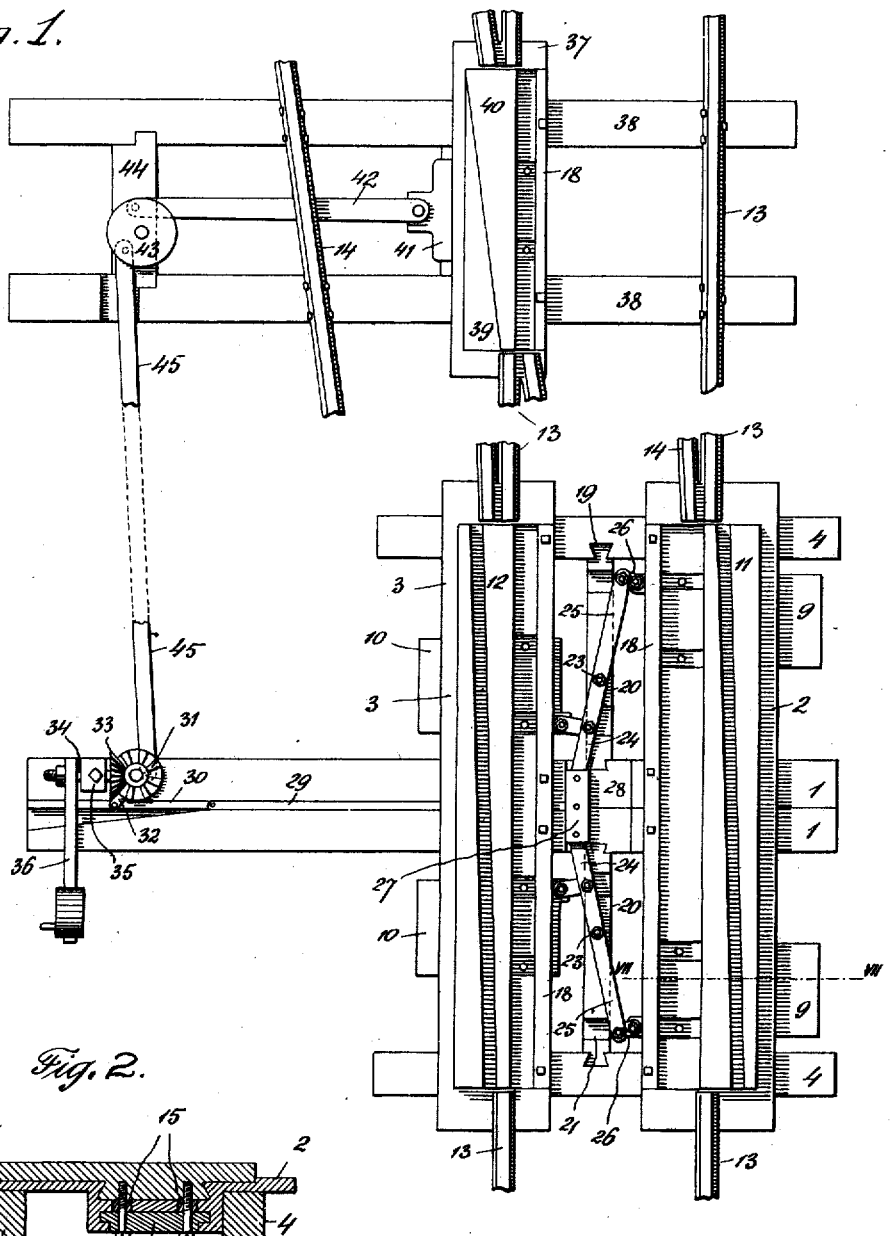
Fig. 1.
Fig. 2.
Witnesses
E. Fogrell
A. H. Butler
Inventor
A. L. VISSAT,
By 
Attorneys

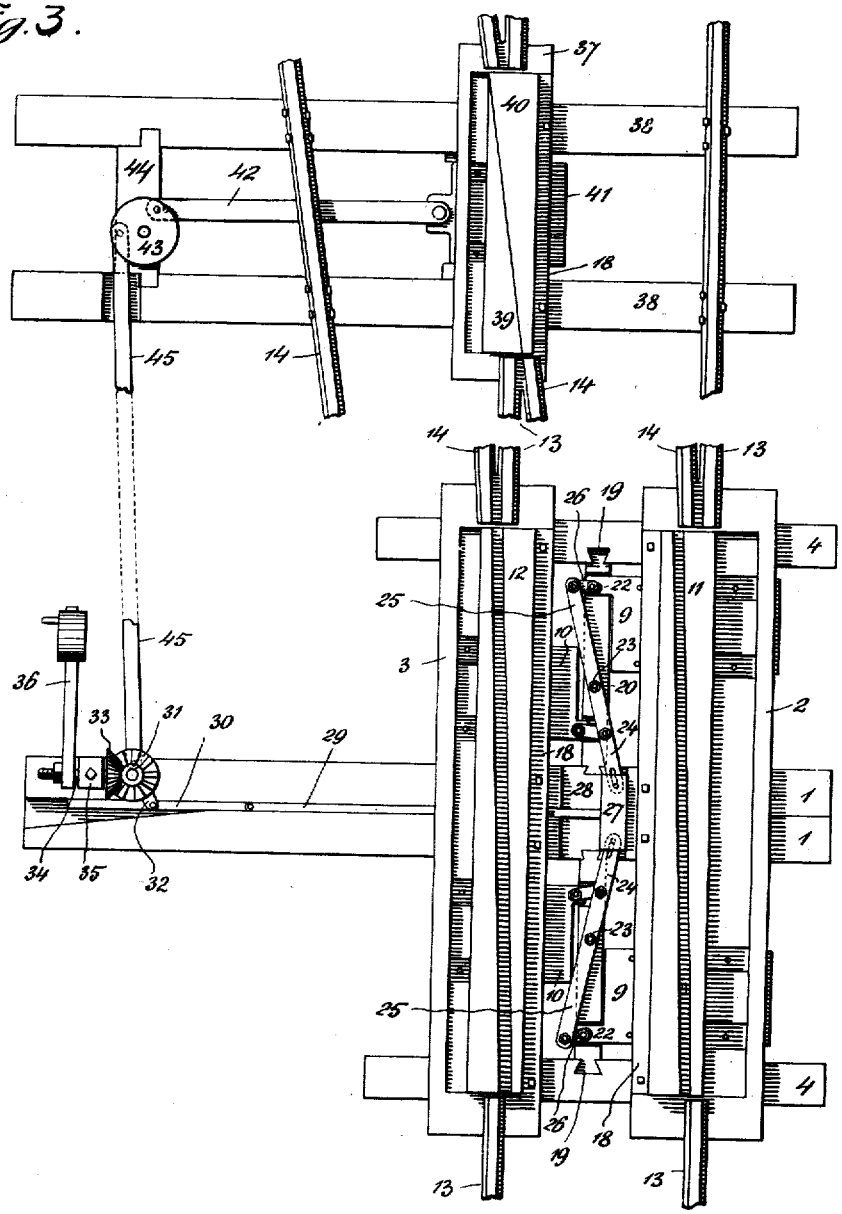

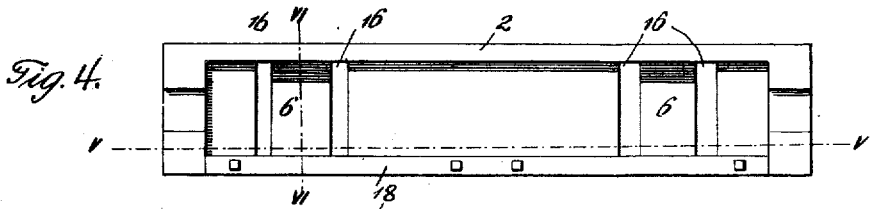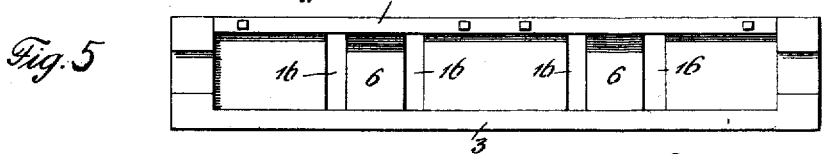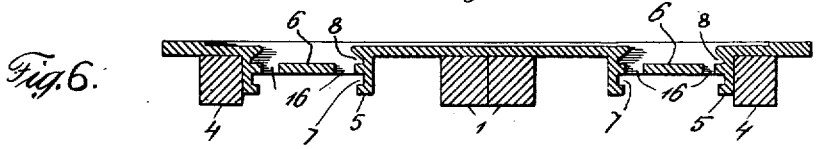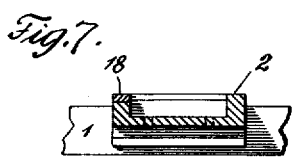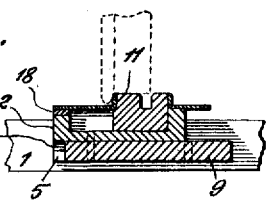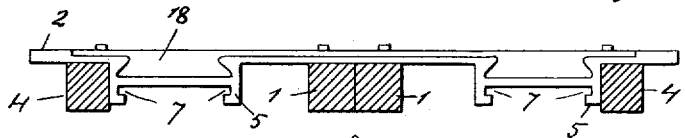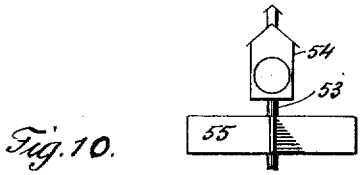

UNITED STATES PATENT OFFICE.

ANTHONY L. VISSAT, OF BRIDGEVILLE, PENNSYLVANIA.

SWITCH.

No. 912,049.  Specification of Letters Patent.  Patented Feb. 9, 1909.

Application filed March 31, 1908. Serial No. 424,452.

*To all whom it may concern:*

Be it known that I, ANTHONY L. VISSAT, a citizen of the United States of America, residing at Bridgeville, in the county of Allegheny and State of Pennsylvania, have invented certain new and useful Improvements in Switches, of which the following is a specification, reference being had therein to the accompanying drawing.

This invention relates to switches, and the objects of my invention are, first, to provide positive and reliable means for transferring a train from one track to another; second, to provide a simple and inexpensive switch that can be easily and quickly actuated; third, to provide a switch requiring little if any attention after once being installed; fourth, to provide a strong and durable switch that can be used in connection with electric and steam railways.

I attain the above objects by a structure that will be presently described in detail, and then specifically pointed out in the appended claims.

Referring to the drawings forming a part of this specification, Figure 1 is a plan of my switch partly broken away, illustrating the same in position for main line traffic, Fig. 2 is a detail sectional view of a portion of the switch, Fig. 3 is a plan partly broken away, illustrating the switch in position for side tracking or switching a train, Fig. 4 is a plan of a main switch plate, Fig. 5 is a plan of a side switch plate, Fig. 6 is a longitudinal sectional view taken on the line V—V of Fig. 3, Fig. 7 is a cross sectional view taken on the line VI—VI of Fig. 3, Fig. 8 is a cross sectional view taken on the line VII—VII of Fig. 1, Fig. 9 is an elevation of the inner side of one of the switch plates, Fig. 10 is an elevation of a signal post used in connection with the switch, and Figs. 11 to 13 inclusive are detail views of the signal post.

In the accompanying drawings, 1 designates ties for supporting the central portions of a main switch plate 2 and a side switch plate 3, while the ends of said plates are supported by ties 4. The plates 2 and 3 are constructed with depending housings 5, each housing having a horizontal slotted partition 6 and oppositely disposed guide-ways 7 and 8. Slidably mounted in the guide-way 7 of the plate 2 are flanged plates 9, similar plates 10 being slidably mounted in the guide-ways of the plate 3. Slidably mounted in the guide-ways 8 of the plates 2 and 3 are switch blocks 11 and 12 respectively, these blocks having grooves formed therein for the flanges of car wheels adapted to pass over the same. The blocks 11 and 12 serve functionally as rails, and resting upon the tie plates 2 and 3 are the ends of rails 13, constituting the main track and rails 14 constituting the side track. The blocks 11 and 12 are connected to the plates 9 and 10 by guide blocks 15, these guide blocks being located in the slots 16 of the horizontal partitions 6, and are connected to the plates 9 and 10 and the blocks 11 and 12 by screw bolts 17, whereby the plates 9 and the block 11 will move in unison and the plates 10 and the block 12 in unison, as will presently appear. In order that the blocks 11 and 12 can be placed in the tie plates 2 and 3, the tie plates 2 and 3 are provided with detachable side bars 18.

The confronting faces of the ties 1 and 4 are provided with dove-tailed seats 19 for connecting frames 20, said frames having their upper faces recessed as at 21, for the projections 22 of the plates 9 and 10. Pivotally mounted upon the connecting frames 20, as at 23, are bars 24 and 25, said bars being attached to the projections 22 of the plates 9 and 10 by links 26. The confronting ends of the bars 24 and 25 are loosely connected to the cross head 27, slidably mounted in recesses 28 provided therefor in the ties 1. The cross head 27 is connected to a rod 29 that extends beneath the tie plate 3 and connects with another rod 30. Upon one of the ties 1 is revolubly mounted a beveled gear wheel 31 having a crank arm 32 pivotally connected to the rod 30. Meshing with the beveled gear wheel 31 is a beveled gear wheel 33, mounted upon the shaft 34, journaled in a bearing 35 carried by one of the ties 1. The shaft 34 is provided with a weighted switch arm 36. When the switch arm 36 is thrown, the beveled gear wheel 31 is rotated to move the rods 30 and 29 and by virtue of the cross head 27, bars 24 and 25, the plates 9 and 10 will be shifted to move the switch blocks 11 and 12 simultaneously in opposite directions.

A frog plate 37 is located at the intersection of the main and side tracks and is supported by ties 38 and said plate is constructed similar to the plates 2 and 3, with the exception that the switch block 39 thereof is provided with a triangular enlargement 40 serving functionally as a tread or rail for rolling stock. The plate 41 is connected to the block 39 and is provided with a link 42 eccentrically connected to a disk 43 revolubly mounted upon a bearing 44, carried between the ties 38. Eccentrically connected to the disk 43 and the gear wheel 31 is a connecting rod 45. The connection between the gear wheel 31 and the plate 41 makes it possible for the block 39 to be moved simultaneously with the blocks 11 and 12, thereby insuring perfect safety of trains passing over the switch.

In Figs. 11 to 13 inclusive I have illustrated a slight modification of my invention wherein the gear wheel 31 is journaled upon a signal post 46, within a suitable housing 47 carried by the ties 1. The gear wheel 31 is provided with brackets 48 for supporting a head 49, said head having sector-shaped blocks 50 adapted to be engaged by oppositely disposed ribs 51 carried by a cap 52 mounted upon the upper end of the signal post 46. The cap 52 is provided with a standard 53 carrying a lantern box 54 and semaphore arms 55.

It is thought that my invention will be fully understood from the foregoing description and I reserve the right to make such structural changes as are permissible by the appended claims.

Having now described my invention what I claim as new, is:—

1. In a switch, the combination with a main track and a side track, ties for supporting said tracks, of tie plates carried by some of said ties, said tie plates having guide-ways formed therein, plates mounted in some of said guide-ways, grooved switch blocks mounted in the other of said guide-ways, guide blocks for connecting said plates with said switch blocks, frames connecting some of said ties, bars pivotally mounted upon said frames, and connecting with the last mentioned plates, a cross head connecting said bars, a beveled gear wheel revolubly mounted upon one of said ties, a crank arm carried by said gear wheel, rods connecting said crank arm with said cross head, a frog plate at the intersection of said tracks, a frog block movably mounted in said plate, a disk movably mounted adjacent to said frog plate, a link eccentrically connected to said disk for moving said frog block, a rod eccentrically connected to said disk and to said gear wheel, and means for rotating said wheel and simultaneously moving said switch blocks and said frog block, substantially as described.

2. In a switch, the combination with a main track and a side track, ties for supporting said tracks, of tie plates carried by some of said ties, said tie plates having guide-ways formed therein, plates mounted in some of said guide-ways, grooved switch blocks mounted in the other of said guide-ways, guide blocks for connecting said plates with said switch blocks, frames connecting some of said ties, bars pivotally mounted upon said frames, and connecting with the last mentioned plates, a cross head connecting said bars, a beveled gear wheel revolubly mounted upon one of said ties, a crank arm carried by said gear wheel, rods connecting said crank arm with said cross head, a frog plate at the intersection of said tracks, a frog block movably mounted in said plate, and means actuated by the movement of said gear wheel for simultaneously moving said switch blocks and said frog block, substantially as described.

3. In a switch, the combination with a main track and a side track, ties for supporting said tracks, of tie plates carried by some of said ties, said tie plates having guide-ways formed therein, plates mounted in some of said guide-ways, grooved switch blocks mounted in the other of said guide-ways, guide blocks for connecting said plates with said switch blocks, frames connecting some of said ties, bars pivotally mounted upon said frames, and connecting with the last mentioned plates, a cross head connecting said bars, a frog plate at the intersection of said tracks, a frog block movably mounted in said plate, and means for simultaneously moving said switch blocks and said frog block.

In testimony whereof I affix my signature in the presence of two witnesses.

ANTHONY L. VISSAT.

Witnesses:
H. C. EVERT,
MAX H. SROLOVITZ.